US010776241B1

(12) United States Patent
Christensen et al.

(10) Patent No.: US 10,776,241 B1
(45) Date of Patent: Sep. 15, 2020

(54) AUTOMATED PROCESS PERFORMANCE DETERMINATION

(71) Applicant: Workday, Inc., Pleasanton, CA (US)

(72) Inventors: Lynn Christensen, Oakland, CA (US); Amitesh Sinha, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 379 days.

(21) Appl. No.: 15/809,909

(22) Filed: Nov. 10, 2017

(51) Int. Cl.
*G06F 11/34* (2006.01)
*G06Q 30/02* (2012.01)
*G06F 11/30* (2006.01)
*G06N 20/00* (2019.01)

(52) U.S. Cl.
CPC ...... *G06F 11/3409* (2013.01); *G06F 11/3006* (2013.01); *G06N 20/00* (2019.01); *G06Q 30/0203* (2013.01)

(58) Field of Classification Search
CPC .................................................. G06F 11/3409
USPC ........................................................ 702/186
See application file for complete search history.

(56) References Cited

U.S. PATENT DOCUMENTS

| 9,608,880 | B1* | 3/2017 | Goodall | H04L 43/045 |
|---|---|---|---|---|
| 10,055,262 | B1* | 8/2018 | Thomas | G06F 9/5083 |
| 10,372,572 | B1* | 8/2019 | Kesarwani | G06F 11/261 |
| 2016/0117785 | A1* | 4/2016 | Lerick | G06Q 10/1095 |
| | | | | 705/305 |
| 2017/0068968 | A1* | 3/2017 | Ghosh | G06Q 30/0201 |
| 2017/0310556 | A1* | 10/2017 | Knowles | H04L 41/142 |
| 2018/0108000 | A1* | 4/2018 | Bhattacharjee | G06Q 30/02 |

* cited by examiner

*Primary Examiner* — Ricky Ngon
(74) *Attorney, Agent, or Firm* — Van Pelt, Yi & James LLP

(57) ABSTRACT

A system for automated process performance determination includes an interface and a processor. The interface is configured to receive log data associated with a plurality of tenants. The log data comprises one or more log data types. The processor is configured to aggregate the log data into an aggregated set of log data; and determine a set of metrics based at least in part on the aggregated set of log data. A metric of the set of metrics is associated with a tenant of the plurality of tenants and one of the one or more log data types. The processor is further configured to determine a composite metric for the tenant by combining metrics of the set of metrics associated with the tenant; determine a response based at least in part on the composite metric; and, in the event the response indicates an automated action, perform the automated action.

19 Claims, 11 Drawing Sheets

US 10,776,241 B1

AUTOMATED PROCESS PERFORMANCE DETERMINATION

BACKGROUND OF THE INVENTION

A computer system administrator has the responsibility of monitoring a set of computer systems to ensure that they are providing the desired performance. The set of computer systems typically includes one or more server systems configured for different purposes (e.g., application servers, database servers, mail servers, firewall servers, etc.), as well as a set of client systems interacting with the server systems. In the event the computer system administrator determines that a system is not performing properly, the computer system administrator is able to manually fix the system. For a very large computer system (e.g., for a large company), a team of many computer system administrators is necessary to maintain the computer system performance. A business services company providing a software as a service model maintains a set of computer systems, including individual large computer systems for large clients and shared computer systems for smaller clients. When the company serves a very large number of clients, including clients of different size utilizing different configurations of software and hardware, not even a large team of computer system administrators will be able to adequately monitor the systems for each client and manually fix problems, creating a problem where some clients' performance will suffer without the situation being recognized or corrected by a computer system administrator.

BRIEF DESCRIPTION OF THE DRAWINGS

Various embodiments of the invention are disclosed in the following detailed description and the accompanying drawings.

DETAILED DESCRIPTION

Figure 1:
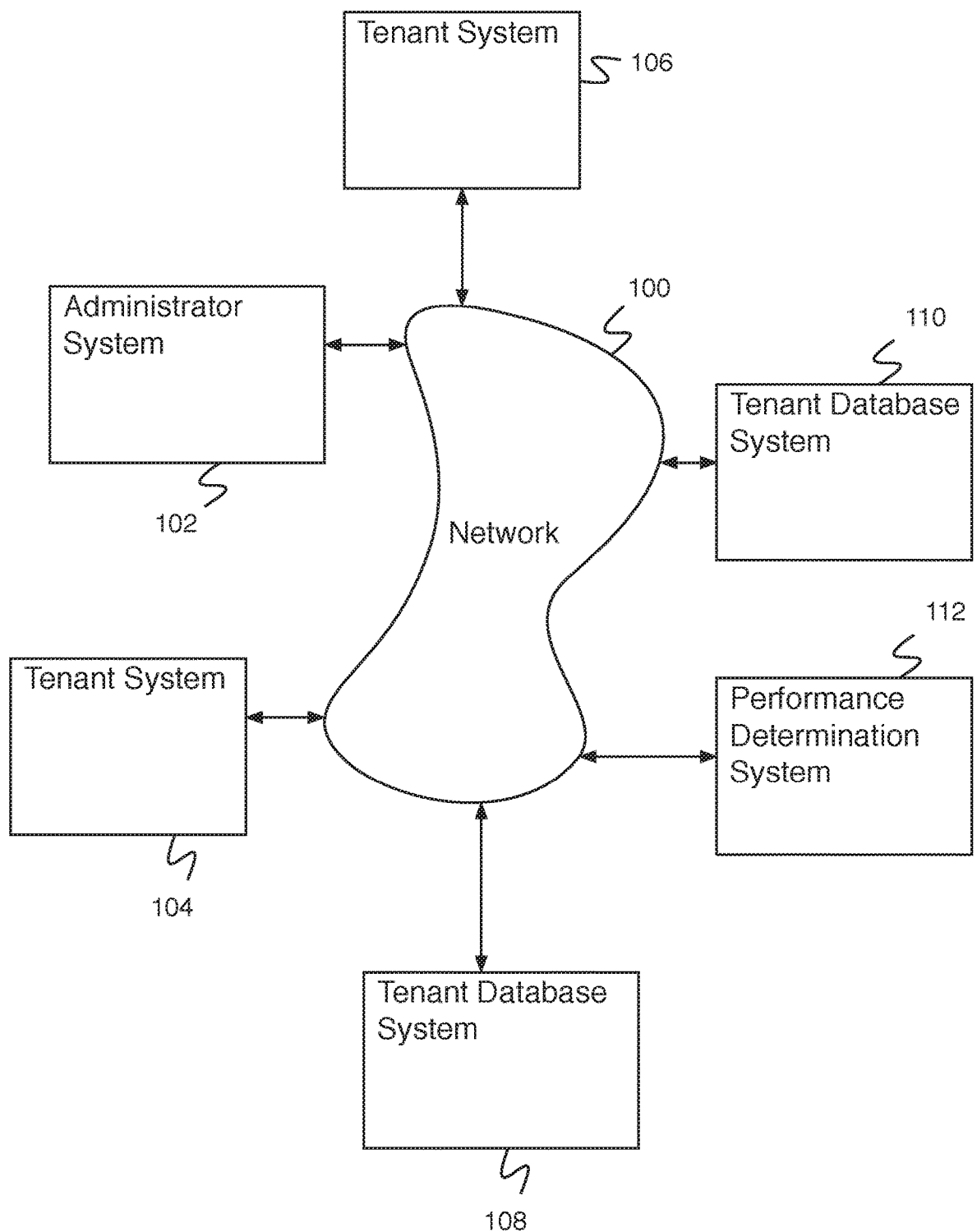
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automated process performance determination comprises an interface configured to receive log data associated with a plurality of tenants, wherein the log data comprises one or more log data types. The system additionally comprises a processor configured to aggregate the log data into an aggregated set of log data, determine a set of metrics based at least in part on the aggregated set of log data, wherein a metric of the set of metrics is associated with a tenant of the plurality of tenants and one or more of the log data types, determine a response based at least in part on the composite metric, and in the event the response indicates an automated action, perform the automated action. The system additionally comprises a memory coupled to the processor and configured to provide the processor with instructions.

The system for automated process performance determination comprises a system for automatically monitoring the performance of a set of computer systems, each computer system associated with a tenant organization. The performance of each computer system is monitored along a set of metrics—for example, process performance, support success, data center outage performance, hardware performance, customer commitment success, customer cost to serve, security incident performance, customer survey performance, etc. The metrics are combined for each tenant to create a holistic metric for the tenant. The set of metrics and the holistic metric can be provided in a user interface to very quickly inform a system administrator of which tenant systems are performing well and which tenant systems are performing poorly.

The system for automated process performance determination additionally comprises a system for automatically determining a response based at least in part on the composite metric (e.g., a metric that includes a combination of other metrics—for example, a linear or non-linear combination of metrics). In the event the composite metric indicates that the performance is satisfactory, the determined response comprises no response (e.g., nothing needs to be done). In the event the composite metric indicates that the performance is not satisfactory, system data is analyzed to determine the response. Individual metrics and the composite metric can both be analyzed to determine the response. Responses are determined using a set of response determining algorithms. For example, in the event the hardware performance metric is below a threshold, a response to automatically add hardware capacity is determined. In the event the composite metric is below a threshold, it is determined that a broad set of things is failing. A response to automatically produce a detailed set of performance diagnostics and further analyze the performance diagnostics is determined. In the event that the composite metric does not indicate performance is satisfactory but no metric falls below a threshold, a response is determined using machine learning. A classifier determines an underlying behavior that can be addressed, either by an automated action (e.g., by a software update, a system configuration, adding hardware capacity, etc.), or by a manual action (e.g., a bug fix, installation of different software, creation of new software, etc.). The system for automated process performance determination additionally comprises a system for performing an automated action in the event that the automated action is indicated by the response.

The system is designed to make a computation systems or set of computation systems better and able to self-adjust or address performance issues. In particular, based on one or more simple or complex metrics automated or manual solutions are generated and indicated to address the performance and in some cases, automatically implemented.

FIG. 1 is a block diagram illustrating an embodiment of a network system. In some embodiments, the network system of FIG. 1 comprises a system for automated process performance determination. In the example shown, tenant system 104 and tenant system 106 store data in tenant database system 108 and tenant database system 100 (e.g., respectively). Tenant system 104 and tenant system 106 comprise tenant systems each for use by a tenant (e.g., a customer organization) to access a tenant database system. A tenant database system comprises a set of server systems (e.g., database storage systems, database read server systems, database write server systems, application server systems, data reporting systems, etc.). A tenant database system is associated with one or more tenants (e.g., a single larger tenant or a plurality of smaller tenants). A tenant database system associated with a plurality of tenants stores data in such a way that tenant data is not commingled and tenants do not have access to each other's data. In various embodiments, the network system of FIG. 1 comprises any appropriate number of tenant systems and any appropriate number of tenant database systems.

Performance determination system 112 comprises a system for determining the performance of a set of tenant database systems (e.g., tenant database system 108 and tenant database system 110). Administrator system 102 communicates with performance determination system 112 to monitor the performance of the set of tenant database systems. Each tenant database system stores a collection of sets of log data (e.g., performance log data, hardware outage log data, customer survey data, security incidence data, support ticket data, hardware configuration data, customer commitment data, cost to serve data, etc.).

Performance determination system 112 receives log data from the tenant database systems, aggregates the log data into an aggregated set of log data, and determines a set of metrics based at least in part on the aggregated set of log data. The set of metrics comprises a set of metrics associated with each tenant (e.g., metrics determined independently by tenant even when multiple tenants are associated with a single tenant database system). Metrics include a performance metric, a support health metric, a customer survey metric, a hardware configuration metric, a security incidence metric, a customer commitment metric, a data center outage metric, a cost to serve metric, etc. Performance determination system 112 additionally determines a composite metric associated with each tenant (e.g., a combination of other metrics and characteristics of the composite metrics—for example, a mean, a median, a mean less standard deviation, etc.). In some embodiments, performance determination system 112 provides a user interface (e.g., to an administrator via administrator system 102, a user of a tenant system such as tenant system 104 or tenant system 106, etc.) displaying the composite metric and any appropriate number of other metrics in a way that can be easily understood. Performance determination system 112 additionally determines a response (e.g., a response associated with each tenant) based at least in part on the composite metric, and in the event the response indicates an automated action, performance determination system 112 performs the automated action.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant database system 108 or tenant database system 110, for determining performance using performance determination system 112, etc.

Figure 2:
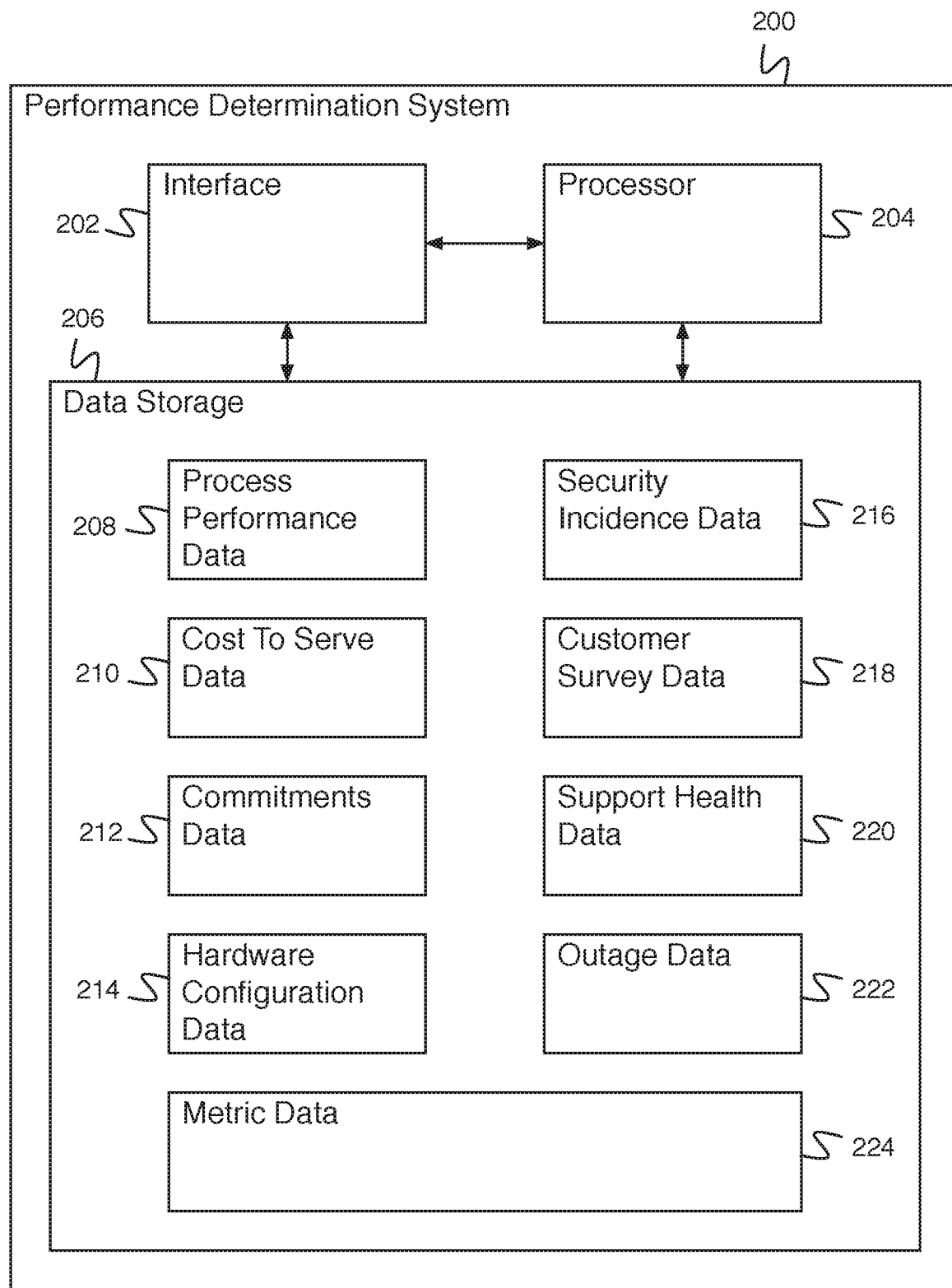
FIG. 2 is a block diagram illustrating an embodiment of a performance determination system.

FIG. 2 is a block diagram illustrating an embodiment of a performance determination system. In some embodiments, performance determination system 200 comprises performance determination system 112 of FIG. 1. In the example shown, performance determination system 200 comprises interface 202 and processor 204. Interface 202 comprises an interface for receiving log data associated with one or more tenants, receiving a request for performance data, for receiving performance determination system configuration information, for providing performance data, for providing commands for executing an automated action, etc. Processor 204 comprises a processor for aggregating log data into an aggregated set of log data, determining a set of metrics based at least in part on the aggregated set of log data, determining a composite metric, determining a response based at least in part on a composite metric, determining whether a response indicates an automated action, performing an automated action, etc. Data storage 206 comprises a set of stored data for performance determination. For example, data storage 206 comprises a set of stored aggregated data for performance determination (e.g., log data is aggregated as it is received and stored in data storage 206). As another example, data storage 206 comprises data for performance determination including one or more of the following: process performance data 208 (e.g., data indicating average process execution times, fraction of process executions that take less than a threshold amount of time, etc.), security incidence data 216 (e.g., data describing frequency and/or severity of security incidents), cost to serve data 210 (e.g., data describing a cost to support tenant database system resources), customer survey data 218 (e.g., reported customer satisfaction data), commitments data 212 (e.g., data describing a success rate of commitments made to tenants, data describing a number of outstanding commitments to tenants), support health data 220 (e.g., data describing a number and/or severity of outstanding support tickets, data describing a rate of addressing support tickets, etc.), hardware configuration data 214 (e.g., data describing a stability and/or quality of a tenant database system hardware configuration), outage data 222 (e.g., data describing a frequency, number, and/or duration of hardware outages), and metric data 224 (e.g., a set of metrics determined based at least in part on an aggregated set of data), or any other appropriate data for performance determination.

Figure 3:
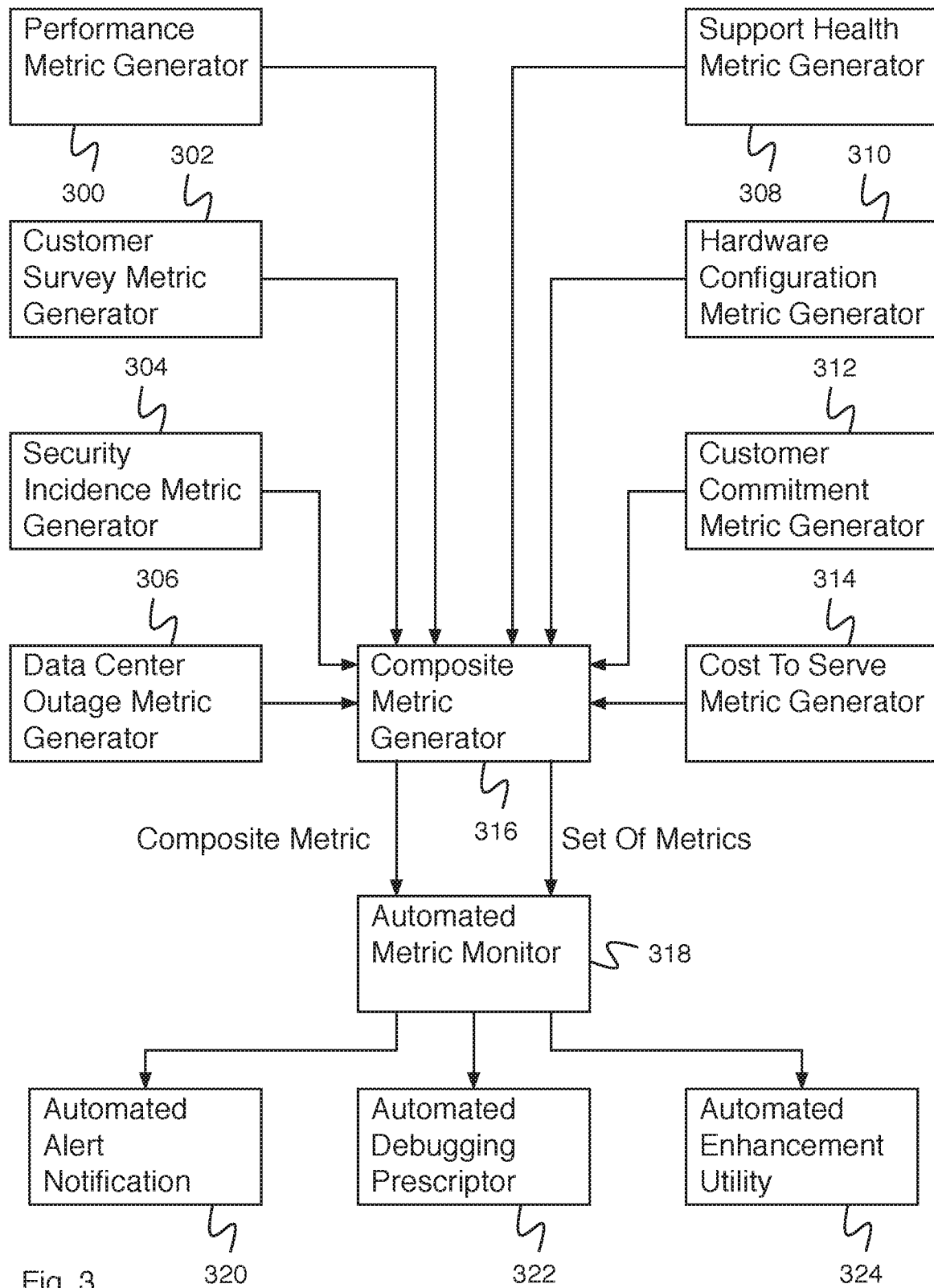
FIG. 3 is a block diagram illustrating an embodiment of a system for automatically determining process performance and automatically determining a process performance response.

FIG. 3 is a block diagram illustrating an embodiment of a system for automatically determining process performance and automatically determining a process performance response. In some embodiments, the system of FIG. 3 is implemented by processor 204 of FIG. 2. In the example shown, the system of FIG. 3 comprises a set of metric generators. Performance metric generator 300 determines a performance metric based at least in part on aggregated process performance data (e.g., process performance data 208 of FIG. 2). Performance metric generator 300 determines a performance metric based at least in part on aggregated process performance data (e.g., process performance data 208 of FIG. 2). Customer survey metric generator 302 determines a performance metric based at least in part on aggregated customer survey data (e.g., customer survey data 218 of FIG. 2). Security incidence metric generator 304 determines a performance metric based at least in part on aggregated security incidence data (e.g., security incidence data 216 of FIG. 2). Data center outage metric generator 306 determines a performance metric based at least in part on aggregated outage data (e.g., outage data 218 of FIG. 2). Support health metric generator 308 determines a performance metric based at least in part on support health data (e.g., support health data 220 of FIG. 2). Hardware configuration metric generator 310 determines a performance metric based at least in part on hardware configuration data (e.g., hardware configuration data 214 of FIG. 2). Customer commitment metric generator 302 determines a performance metric based at least in part on aggregated commitments data (e.g., commitments data 212 of FIG. 2). Cost to serve metric generator 302 determines a performance metric based at least in part on aggregated customer survey data (e.g., customer survey data 218 of FIG. 2). Composite metric generator 316 determined a composite metric based at least in part on one or more metrics of the set of metrics generated by the set of metric generators (e.g., based at least in part on one or more of the performance metric, the customer survey metric, the security incidence metric, the data center outage metric, the support health metric, the hardware configuration metric, the customer commitment metric, the cost to serve metric, or any other performance metric). Automated metric monitor 318 monitors metrics (e.g., the composite metric and the set of metrics generated by the set of metric generators) and determines a response. Automated alert notification 320 provides an automated alert for an alert response. For example, automated alert notification 320 notifies a predefined set of users when the composite metric drops below a threshold. Automated debugging prescriptor 322 provides an automated debugging indication for an automated debugging response. For example, automated debugging prescriptor 322 identifies a type of problem being detected and provides an indication of potential fixes and enhancements. Automated enhancement utility 324 provides an automated enhancement for an enhancement response. For example, automated enhancement utility 324 makes an automated correction based on the recommendations indicated by automated debugging prescriptor 322.

Figure 4:
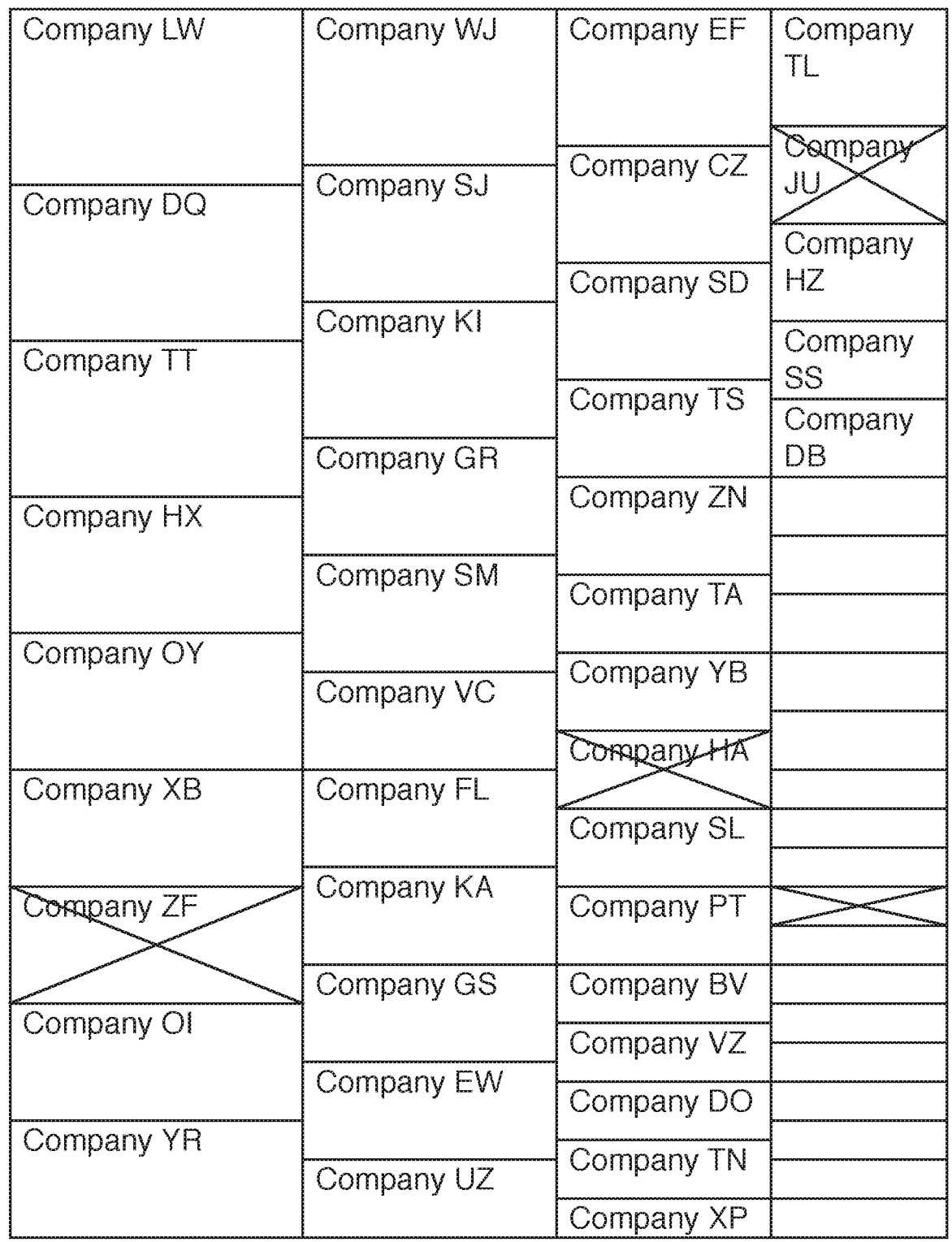
FIG. 4 is a diagram illustrating an embodiment of a visualization user interface for an automated alert notification.

FIG. 4 is a diagram illustrating an embodiment of a visualization user interface for an automated alert notification. In some embodiments, the user interface of FIG. 4 comprises a user interface providing automated alerts indicated by the system of FIG. 3 (e.g., by automated alert notification 320 of FIG. 3). In some embodiments, the user interface of FIG. 4 comprises a user interface provided to a system administrator (e.g., a system administrator using administrator system 102 of FIG. 1). In the example shown, the user interface of FIG. 4 shows a set of rectangles, each rectangle associated with a tenant of a set of tenants. The rectangles are labeled with a tenant name or a tenant code (e.g., "Company LW," "Company DQ," "Company TT," etc.). The rectangles are scaled in size according to the size of the tenant (e.g., the number of processors used by the tenant, the amount of data storage used by the tenant, the size of the budget for the tenant, etc.). Some rectangles associated with tenants are drawn too small to display a tenant name or tenant code and are drawn with no tenant name or tenant code. Tenants for which an automated alert is determined are shown with an X drawn over the associated rectangle. In the example shown, Company ZF, Company HA, Company JU, and one company that is too small for its name to be drawn are shown to have an automated alert. The automated alert is determined for tenants determined to have a composite metric below a threshold.

In some embodiments, rectangles representing tenants are drawn with a color indicating whether they have an automated alert (e.g., the rectangles are drawn in green to indicate no automatic alert and are drawn in red to indicate an automatic alert). In some embodiment, multiple levels of alert are shown (e.g., green indicates no alert, yellow indicates medium alert, red indicates high alert).

In some embodiments, a composite metric is displayed to a system administrator using a visualization user interface. In some embodiments, a set of metrics is displayed to a system administrator using a set of visualization user interfaces (e.g., one visualization user interface for each metric of the set of metrics).

In various embodiments, in the event a system administrator makes an indication (e.g., a click) on a rectangle representing a tenant, the system administrator is shown the value of the metric displayed in the user interface, is shown automated actions being taken to improve tenant health, is shown all metrics associated with the tenant, etc.

Figure 5:
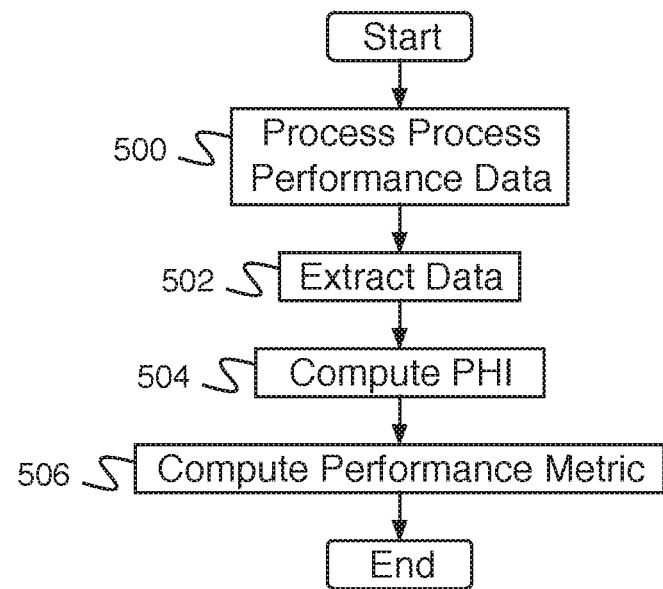
FIG. 5 is a flow diagram illustrating an embodiment of a process for determining a performance metric.

FIG. 5 is a flow diagram illustrating an embodiment of a process for determining a performance metric. In some embodiments, the process of FIG. 5 is used by a performance metric generator (e.g., performance metric generator 300 of FIG. 3) for determining a performance metric based at least in part on process performance data. In the example shown, in 500, process performance data is processed. For example, process performance data is normalized, filtered, denoised, put into a predetermined format, etc. In 502, data is extracted. In 504, PHI is computed. For example, the Performance Health Index (PHI) measures performance health of a product (e.g., Financials). The value of PHI can range from 0.00 to 1.00. A higher PHI value means a healthier product. PHI is calculated by looking at the response behavior of all tasks in a production environment. PHI is defined at customer, module, product, and a task type levels.

A PHI for a customer indicates the performance health of a specific customer—for example, PHI for a module=the average of the PHIs for UI Tasks, Web Services, Report Writer Reports and Background Jobs. In some cases the PHI is not a simple average, but rather a different function of the PHIs for UI Tasks, Web Services, Report Writer Reports and Background Jobs (e.g., a weighted average).

A PHI for a module indicates the performance health of a specific module—for example, PHI for a module=the average of the PHIs for UI Tasks, Web Services, Report Writer Reports, and Background Jobs. In some cases the PHI is not a simple average, but rather a different function of the PHIs for UI Tasks, Web Services, Report Writer Reports, and Background Jobs (e.g., a weighted average)

A PHI for a product indicates the aggregated performance health across all modules in that product. This is calculated by averaging the PHI scores of all the modules (e.g., PHI for a product=the sum of the PHI scores of all individual modules/number of modules). In some embodiments, financials has 10 modules including assets, budgets, etc.

A PHI for a task type (e.g., user interface (UI), web services, reports, and jobs) indicates the performance health of a specific task type—for example, PHI for a task type=% TASK_EXECUTION_UNDER THRESHOLD. The percentage task execution under the threshold represents a ratio of tasks meeting our internal threshold to the total number of tasks—for example, in the case that there are 100 UI task executions for a task and 95 of them meet our threshold, then 0.95 is the PHI Score for the task. In some cases, the update task threshold for a UI or web service task type is that a percentage (e.g., 90%) or more of the executions need to complete within a given time (e.g., 2 seconds) and/or a percentile task update time (e.g., $95^{th}$ percentile task update time) is less than or equal to 0.5 seconds. In some cases, the read task threshold for a UI or web service task type is that a percentage (e.g., 90%) or more of the executions need to complete within a given time (e.g., 2 seconds). In some cases, a report task threshold is that a percentage (e.g., 90%) or more of the executions need to complete within a given time (e.g., 2 seconds). In some cases, a job task threshold is that a partition read time is less than or equal to a time (e.g., 2 seconds) or a partition update time is less than or equal to a time (e.g., 0.5 seconds).

In 506, the performance metric is computed. For example, a metric comprises a color code: green for PHI of 0.90-1.00; yellow for PHI of 0.80-0.89; and red for PHI of 0.00-0.79. In some embodiments, a performance metric of 3 corresponds to greater than 90% of process executions for the tenant under 2 seconds, a performance metric of 2 corresponds to 80%-90% of process executions for the tenant under 2 seconds, and a performance metric of 1 corresponds to less than 80% of process executions for the tenant under 2 seconds.

Figure 6:
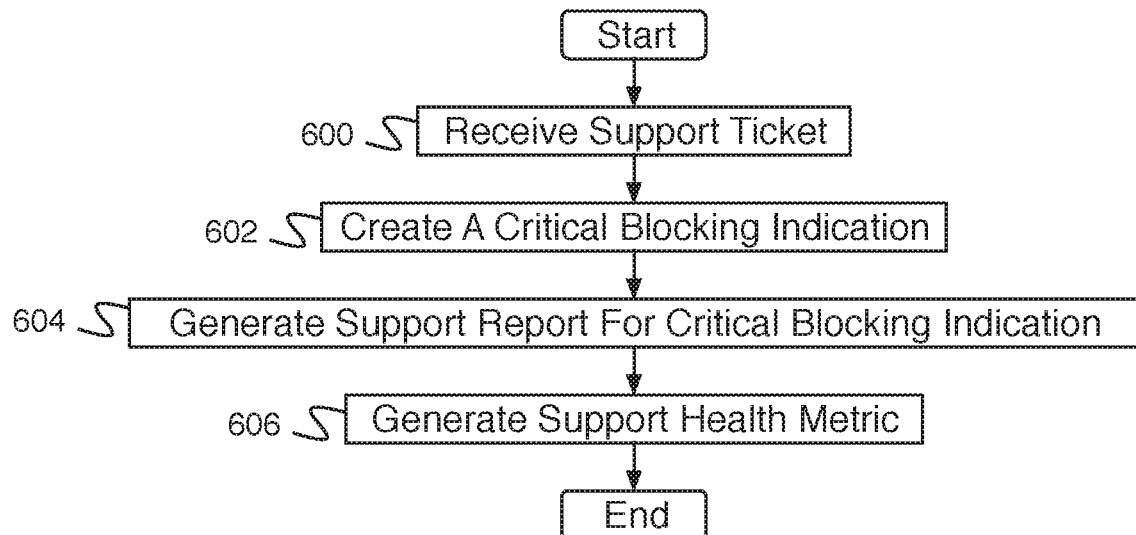
FIG. 6 is a flow diagram illustrating an embodiment of a process for determining a support health metric.

FIG. 6 is a flow diagram illustrating an embodiment of a process for determining a support health metric. In some embodiments, the process of FIG. 6 is used by a support health metric generator (e.g., support health metric generator 308 of FIG. 3) for determining a performance metric based at least in part on support health data. In the example shown, in 600, a support ticket is received. For example, a support ticket is identified in the support health data. In 602, a critical blocking indication is generated. In 604, a support report for the critical blocking indication is generated. In 606, a support health metric is generated. For example, a health metric is an average of a UI health metric, a web service metric, and a report metric. The UI health metric is the percentage number of tasks that complete in in under a time (e.g., 2 seconds). The web service metric is the percentage number of tasks that run under a time (e.g., 2 seconds). The report metric is the percentage of tasks that run under a time (e.g., 30 seconds). In some embodiments, a support health metric of 3 corresponds to 0 critical blocking indications in the last month, a support health metric of 2 corresponds to 1 critical blocking indication created and closed in the last month, and a support health metric of 1 corresponds to 2 or more critical blocking indications created in the last month, or at least one critical blocking indication remaining open. In some embodiments, a score of 4 corresponds to no blocker or critical customer reported bug or no open items; a score of 3 corresponds to up to 3 blocker or critical customer reported bugs or up to 3 open items; and a score of 2 corresponds to 4 or more blocker or critical customer reported bugs or 4 or more open items.

Figure 7:
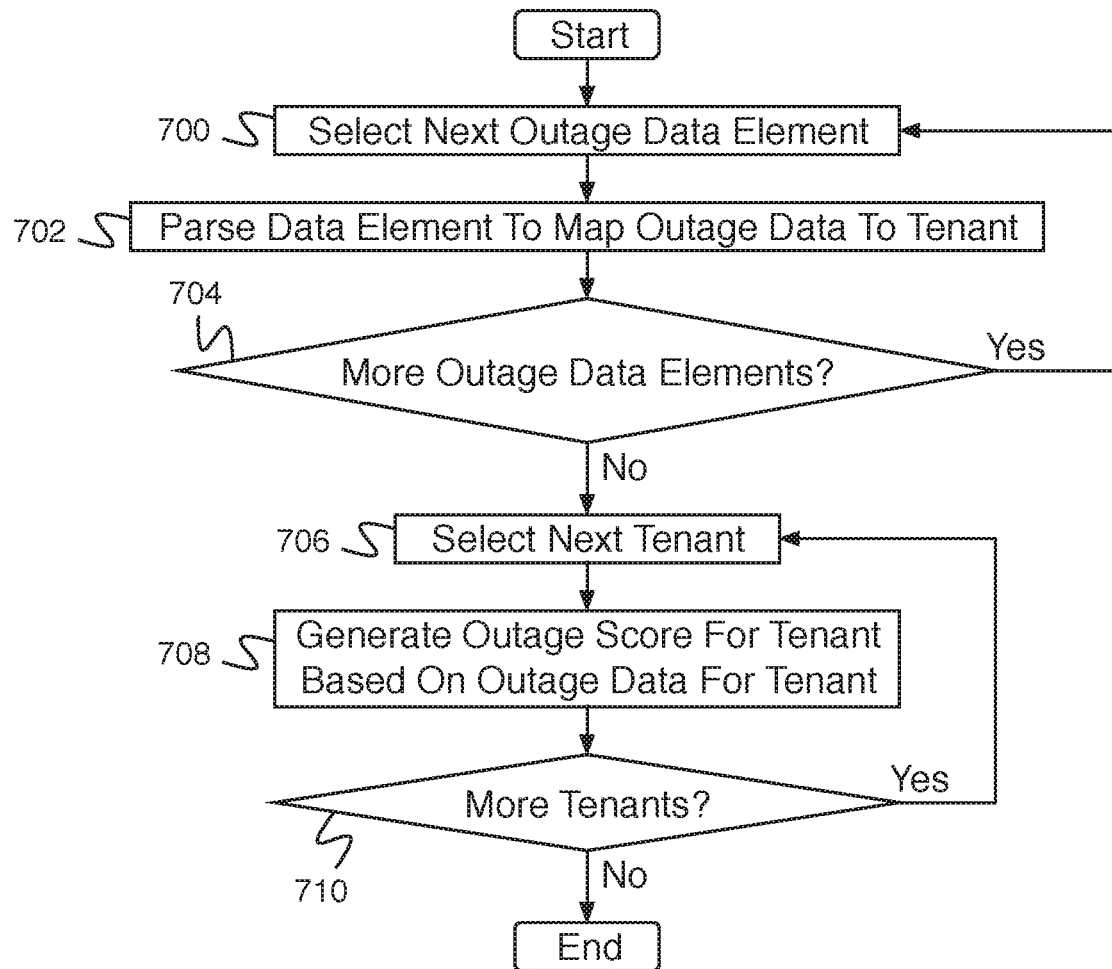
FIG. 7 is a flow diagram illustrating an embodiment of a process for determining a data center outage metric.

FIG. 7 is a flow diagram illustrating an embodiment of a process for determining a data center outage metric. In some embodiments, the process of FIG. 7 is used by a data center outage metric generator (e.g., data center outage metric generator 306 of FIG. 3) for determining a data center outage metric based at least in part on outage data. In the example shown, in 700, a next outage data element is selected. In some embodiments, the next outage data element comprises the first outage data element. In 702, the data element is parsed to map outage data to a tenant. In 704, it is determined whether there are more outage data elements. In the event it is determined that there are more outage data elements, control passes to 700. In the event it is determined that there are not more outage data elements, control passes to 706. In 706, the next tenant is selected. In some embodiments, the next tenant comprises the first tenant. In 708, an outage score is generated for the tenant based on outage data for the tenant. For example, the outage score is generated based on outage data elements mapped to the tenant. In some embodiments, a data center outage score of 4 corresponds to no outages; a score of 3 corresponds to outage duration under a time (e.g., 15 minutes) and an outage occurrence not more than 1 time; and a score of 2 corresponds to outage duration over a time (e.g., 15 minutes) or an outage occurrence 2 or more times. In 710, it is determined whether there are more tenants. In the event it is determined that there are more tenants, control passes to 706. In the event it is determined that there are not more tenants, the process ends. In some embodiments, a data center outage metric of 3 corresponds to no data center outages in the last month, a data center outage metric of 2 corresponds to one data center outage in the last month for no more than 15 minutes, and a data center outage metric of 1 corresponds to more than one data center outage in the last month or one outage in the last month that lasted for more than 15 minutes.

A customer survey metric score assigns a score based on a customer survey. For example, If net promoter score (NPS) Performance score is 1 && NPS score is 1, overall NPS Survey score is 3; If (NPS Performance score<=0.8 && NPS score is 1) OR (NPS Performance score<0.75 && NPS score<1), overall NPS Survey score is 1.5; If (NPS Performance score<=1 && NPS score is 0) OR (NPS Performance score<=1 && NPS score<=0.75), overall NPS Survey score is 1; and If NPS Performance score is 0 && NPS score is 0, overall NPS Survey score is 0.

A hardware configuration metric score is based on technology components—for example, the metric computes the average of the number of servers (e.g., the average of the total number of servers including transaction servers, read servers, bus servers, storage servers, etc.).

A security incidence metric score is based on security incidents including data security, application security, regulatory compliance, and identity and access management. For example, a score of 4 corresponds to 0 reported blocker or critical incidents; a score of 3 corresponds to 1 reported blocker or critical incident; and a score of 2 corresponds to more than 1 reported blocker or critical incidents.

A customer commitment metric score is based on work committed for a customer. For example, work committed may include the number of customer commits, the number of brainstorms, the number of epics, the story points of committed epics, or any other appropriate work committed for a customer. In some cases, the score of 4 corresponds to 0 customer commits, 0 commits from brainstorms, and 0 epics tied to customer; the score of 3 corresponds to 1-2 customer commits, 1-2 commits from brainstorms, or 1-2 epics tied to customer; and the score of 2 corresponds to 3 or more customer commits, 3 or more commits from brainstorms, or 3 or more epics tied to customer. A score of greater than 3.6 corresponds to green; a score of 3.0-3.6 corresponds to yellow; and a score of less than 3.0 corresponds to red.

A cost to serve metric score is based on work committed for a customer. For example, the metric compares the cost to serve the customer in context of revenue from the customer. For example, the costs may include a customer acquisition cost, a server cost, a support cost, a product development cost, infrastructure cost, and a research and development cost, or any other appropriate cost. In some cases, the score is the ratio of total cost to customer life time value (e.g., a sum of the costs/total revenue associated with customer). The score of 4 corresponds to a ratio of less than 0.5; the score of 3 corresponds to a ratio between 0.5-0.8; and the score of 2 corresponds to a ratio greater than 0.8.

Figure 8:
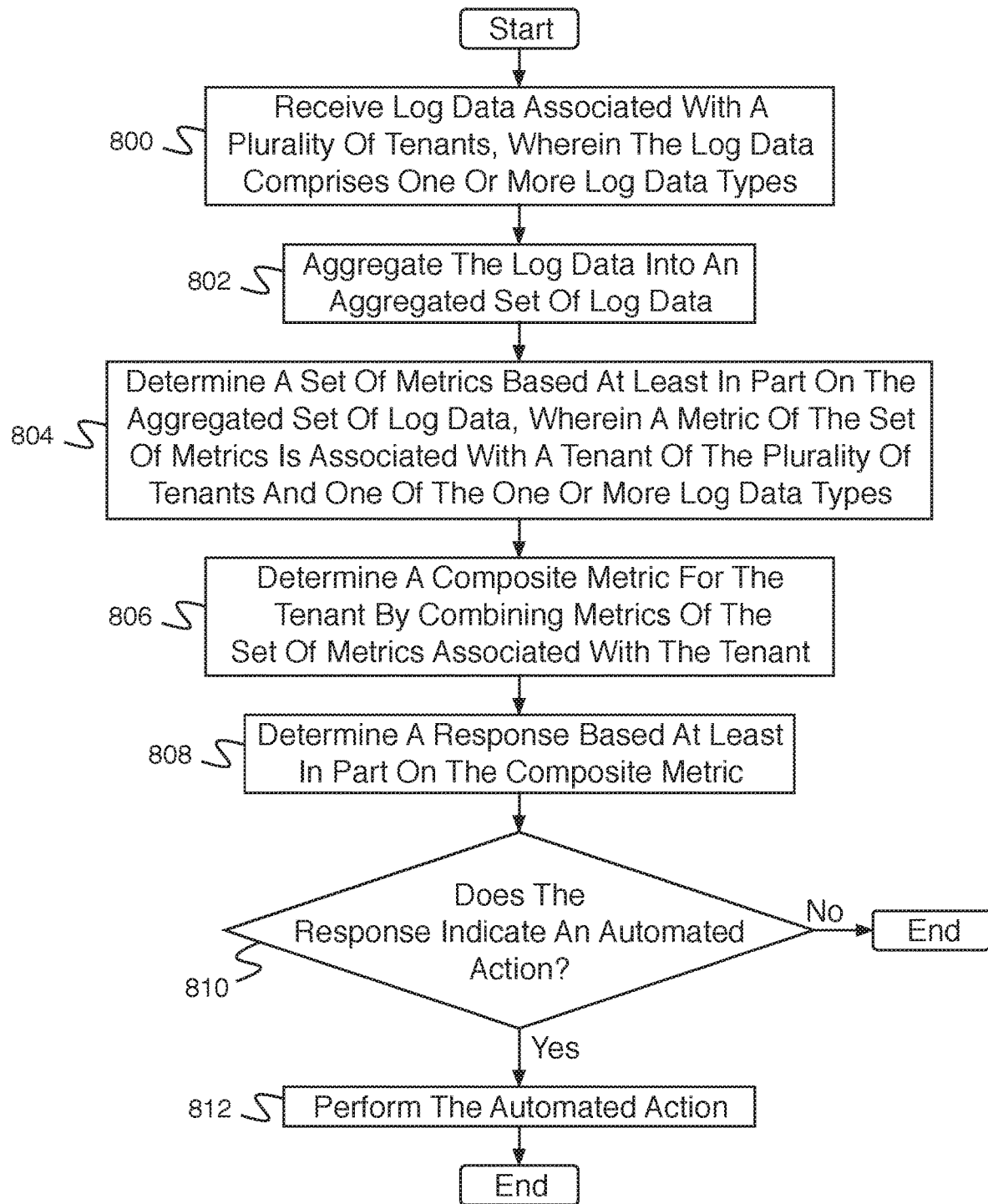
FIG. 8 is a flow diagram illustrating an embodiment of a process for automated process performance determination.

FIG. 8 is a flow diagram illustrating an embodiment of a process for automated process performance determination. In some embodiments, the process of FIG. 8 is executed by performance determination system 112 of FIG. 1. In the example shown, in 800, log data is associated with a plurality of tenants, wherein the log data comprises one or more log data types. In 802, the log data is aggregated into an aggregated set of log data. In 804, a set of metrics is determined based at least in part on the aggregated set of log data, wherein a metric of the set of metrics is associated with a tenant of the plurality of tenants and one of the one or more log data types. In 806, a composite metric for the tenant is determined by combining metrics of the set of metrics associated with the tenant. For example, a group of metrics is used to calculate a composite metric. In 808, a response is determined based at least in part on the composite metric. In 810, it is determined whether the response indicates an automated action. In the event it is determined that the response does not indicate an automated action, the process ends. In the event it is determined that the response indicates an automated action, control passes to 812. In 812, the automated action is performed.

In some embodiments, aggregating log data comprises combining log data from multiple sources (e.g., log data from multiple tenant database systems, log data from other systems, log data associated with multiple tenants, log data received at different times, etc.) in to a single aggregated set of log data. In various embodiments, aggregating log data comprises determining normalized log data, determining a common log data schema, rounding data, filtering data, or processing data in any other appropriate way. In some embodiments, determining a metric of the set of metrics comprises aggregating a data set (e.g., aggregating data of a data type for a tenant). In various embodiments, aggregating a data set comprises determining an average, a median, a maximum, a minimum, a sum, a product, a count, or any other appropriate aggregate. In some embodiments, determining a metric of the set of metrics comprises comparing the aggregated data with a threshold. In various embodiments, combining each metric of the set of metrics associated with the tenant comprises determining an average, a median, a maximum, a minimum, a sum, a product, an average less standard deviation, a count, or combining metrics in any other appropriate way.

In various embodiments, the automated action comprises automatically adding hardware capacity (e.g., automatically adding memory, automatically adding processing capacity, automatically adding new machines, automatically adding virtual machines, etc.), automatically updating software (e.g., automatically applying a software patch, automatically upgrading a software version, automatically downloading software, automatically adding a new software program, etc.), automatically addressing a software bug (e.g., automatically correcting software, automatically determining a software bug location, automatically suggesting a software bug fix to a developer, automatically identifying a software bug to a developer, etc.), or any other appropriate automated action. In some embodiments, an indication of the response is provided to the tenant (e.g., via a tenant system).

Figure 9:
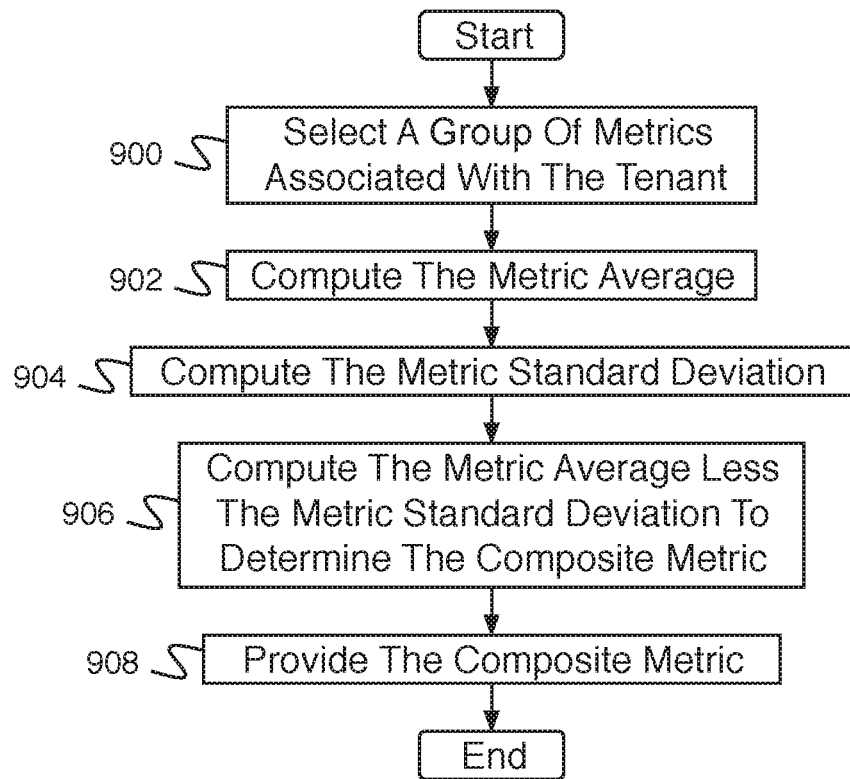
FIG. 9 is a flow diagram illustrating an embodiment of a process for determining a composite metric.

FIG. 9 is a flow diagram illustrating an embodiment of a process for determining a composite metric. In some embodiments, the process of FIG. 9 implements 806 of FIG. 8. In the example shown, in 900, a set of metrics associated with the tenant is selected. For example, the set of metrics comprises one or more of a performance metric, a customer survey metric, a security incidence metric, a data center outage metric, a support health metric, a hardware configuration metric, a customer commitment metric, and a cost to serve metric. In 902, the metric average is computed. In 902, the metric average is computed. In 904, the metric standard deviation is computed. In 906, the metric average less the metric standard deviation is computed to determine the composite metric. For example, computing the metric average less the metric standard deviation causes the composite metric value to be sensitive to low outliers (e.g., lowering any of the metrics causes the composite metric to drop quickly). In some embodiments, a composite score is a weighted average of the individual score (e.g., the composite score=task performance*0.20+quality score*0.35+report score*0.35+data center outage*0.10. A score of greater than 3.6 corresponds to green; a score of 3.0-3.6 corresponds to yellow; and a score of less than 3.0 corresponds to red. In 908, the composite metric is provided.

Figure 10:
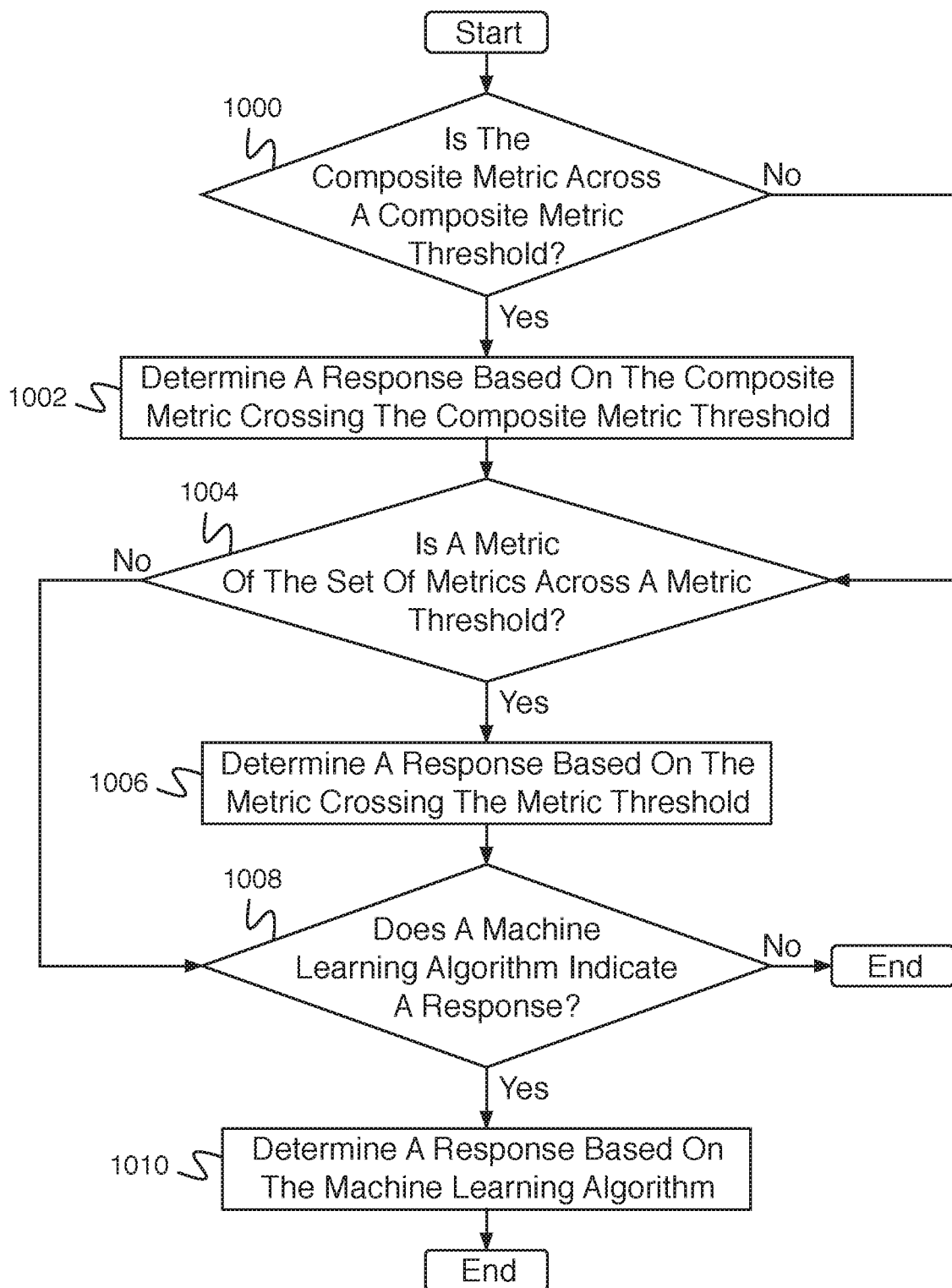
FIG. 10 is a flow diagram illustrating an embodiment of a process for determining a response based at least in part on a composite metric.

FIG. 10 is a flow diagram illustrating an embodiment of a process for determining a response based at least in part on a composite metric. In some embodiments, the process of FIG. 10 implements 808 of FIG. 8. In the example shown, in 1000, it is determined whether a composite metric is across a composite metric threshold. For example, whether the composite metric has fallen below or is above a composite metric threshold. In the event it is determined that the composite metric has not crossed the composite metric threshold, control passes to 1004. In the event it is determined that the composite metric has crossed the composite metric threshold, control passes to 1002. In 1002, a response is determined based on the composite metric crossing the composite metric threshold. For example, a response is determined and then provided and/or indicated. In various embodiments, the response is determined based on a model, a predetermined flow, a heuristic, or any other appropriate way of determining a response. In 1004, it is determined whether a metric of the set of metrics is across a metric threshold. For example, whether the metric has fallen below a metric threshold. In the event it is determined that a metric of the set of metrics is not across a metric threshold, control passes to 1008. In the event it is determined that a metric of the set of metrics is across a metric threshold, control passes to 1006. In 1006, a response is determined based on the metric crossing the metric threshold. For example, the response is determined based at least in part on which metric of the set of metrics crossed the metric threshold. The response is indicated and/or provided after being determined. In various embodiments, the response is determined based on a model, a predetermined flow, a heuristic, or any other appropriate way of determining a response. In 1008, it is determined whether a machine learning algorithm indicates a response. In the event it is determined that the machine learning algorithm does not indicate a response, the process ends. In the event it is determined that the machine learning algorithm indicates a response, control passes to 1010. In 1010, a response based at least in part on the machine learning algorithm is determined. For example, a response is determined and then provided and/or indicated.

Figure 11:
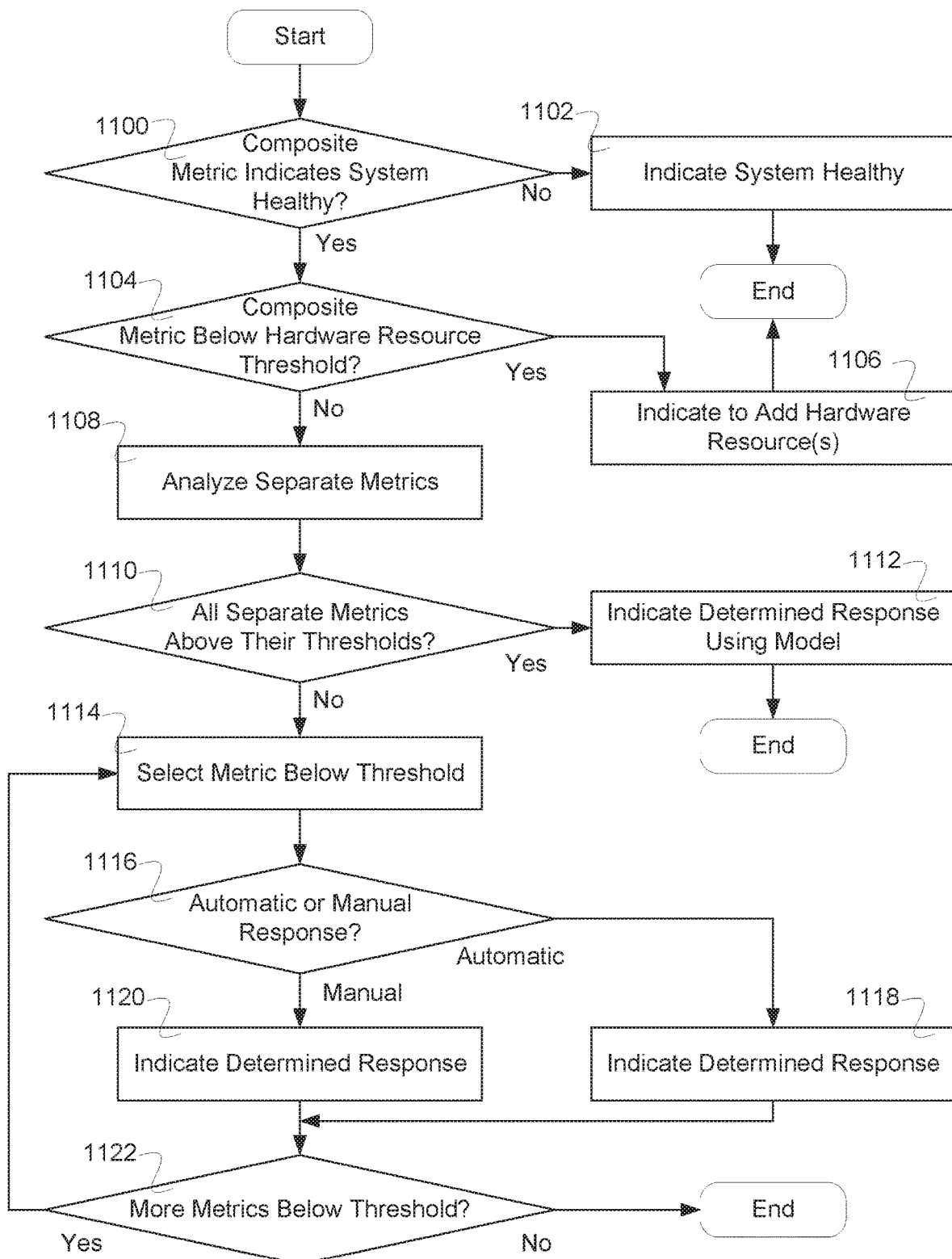
FIG. 11 is a flow diagram illustrating an embodiment of a process to determine a response.

FIG. 11 is a flow diagram illustrating an embodiment of a process to determine a response. In some embodiments, the process of FIG. 11 is used to implement 808 of FIG. 8. In the example shown, in 1100 it is determined whether the composite metric indicates a healthy system. For example, the composite metric is compared to a set of values (e.g., above or below a healthy threshold, in a region of healthy values, etc.) and it is determined whether the system is healthy or not according to the metric. In the event that it is indicated that the system is not healthy, then in 1102 it is indicated that the system is healthy and the process ends. In the event that the system is healthy, then in 1104 it is determined whether the composite metric is below a hardware resource threshold. For example, a threshold is set such that a metric value when below the threshold indicates that hardware should be added to improve performance. In some embodiments, the threshold and metric are designed such that the metric is above the threshold when hardware should be added. In various embodiments, the threshold and metric are designed such that the metric is in a region of values or any other appropriate way to determine whether the system is to have more hardware resources as indicated using the composite metric. In the event that the composite metric is below a hardware resource threshold, then in 1106 in is indicated to add hardware resource(s), and the process ends. For example, a number of cluster resources, processor, memory, and/or storage resources are added based at least in part on the composite metric and its relation to the hardware resource threshold. In the event that the composite metrics is not below a hardware resource threshold, then in 1108 separate metrics are analyzed. In 1110, it is determined whether all the separate metrics are above their thresholds. For example, each metric is examined with regard to a threshold or region of good performance and in the event that there are specific areas that are underperforming, then those areas are addressed specifically. But if the performance does not point to any specific area then a model is used to determine a response. In some embodiments, the threshold and metric are designed such that the metric is above the threshold when certain actions should be taken. In various embodiments, the threshold and metric are designed such that the metric is in a region of values or any other appropriate way to determine whether the system is to have specific actions. A person skilled in the art would know that above, below, or a region of 'goodness' can be arbitrarily designed with metrics and decision paths and can be interchanged with the specific flows described here. In the event that the separate metrics are above their thresholds, then in 1112 a determined response is indicated using a model, and the process ends. For example, the response is determined using a model (e.g., a machine learning algorithm) and the response is indicated to the process that can automatically or manually address the performance. In the event that all the separate metrics are not above their separate metrics, then in 1114 a metric below its threshold is selected and in 1116 it is determined whether an automatic or manual response is used. In the event that an automatic response is used, then in 1118 a determined response is indicated and control passes to 1122. In the event that a manual response is used, then in 1120 a determined response is indicated and control passes to 1122. In 1122 it is determined whether there are more metrics below their threshold. In the event that there are more metrics below their threshold, then control passes to 1114. In the event that there are not more metrics below their threshold, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automated process performance determination, comprising:
   an interface configured to:
      receive, from a plurality of tenant database systems, log data associated with a plurality of tenants, wherein the log data comprises one or more log data types; and a processor configured to:
      aggregate the log data into an aggregated set of log data;
      determine a set of metrics based at least in part on the aggregated set of log data, wherein a metric of the set of metrics is associated with a tenant of the plurality of tenants and one of the one or more log data types, wherein the set of metrics for a tenant are based on an amount of time needed by one or more computing systems associated with the tenant to perform one or more tasks;
      determine a composite metric for the tenant by combining metrics of the set of metrics associated with the tenant;
      determine a response based at least in part on the composite metric; and
      in the event the response indicates an automated action, perform the automated action, wherein the automated action at least includes a software update for the one or more computing systems associated with the tenant.

2. The system of claim 1, wherein a log data type of the one or more log data types comprises one of: a performance log data type, a support log data type, a data center outage log data type, a hardware log data type, a customer commitment log data type, a cost to serve log data type, a security incidence log data type, or a customer survey log data type.

3. The system of claim 1, wherein determining the metric of the set of metrics comprises aggregating a data set.

4. The system of claim 3, wherein aggregating the data comprises determining an average, a median, a maximum, a minimum, a sum, a product, or a count.

5. The system of claim 3, wherein determining the metric of the set of metrics comprises comparing the aggregated data with a threshold.

6. The system of claim 1, wherein aggregating the log data comprises determining normalized log data.

7. The system of claim 1, wherein aggregating the log data comprises determining a common log data schema.

8. The system of claim 1, wherein combining metrics of the set of metrics associated with the tenant comprises determining an average, a median, a maximum, a minimum, a sum, a product, an average less standard deviation, or a count.

9. The system of claim 1, wherein the response is additionally based on the set of metrics associated with the tenant.

10. The system of claim 1, wherein the response is determined based on the metric crossing a threshold.

11. The system of claim 1, wherein the response is determined based on the composite metric crossing a threshold.

12. The system of claim 1, wherein the response is determined using machine learning.

13. The system of claim 1, wherein the automated action comprises automatically adding hardware capacity.

14. The system of claim 1, wherein the automated action comprises addressing a software bug.

15. The system of claim 1, wherein an indication of the response is provided to the tenant.

16. The system of claim 1, wherein the set of metrics is displayed to a system administrator using a set of visualization user interfaces.

17. The system of claim 1, wherein the composite metric is displayed to a system administrator using a visualization user interface.

18. A method for automated process performance determination, comprising:
   receiving, from a plurality of tenant database systems, log data associated with a plurality of tenants, wherein the log data comprises one or more log data types;
   aggregating the log data into an aggregated set of log data;
   determining, using a processor, a set of metrics based at least in part on the aggregated set of log data, wherein a metric of the set of metrics is associated with a tenant of the plurality of tenants and one of the one or more log data types, wherein the set of metrics for a tenant are based on an amount of time needed by one or more computing systems associated with the tenant to perform one or more tasks;
   determining a composite metric for the tenant by combining metrics of the set of metrics associated with the tenant;
   determining a response based at least in part on the composite metric; and
   in the event the response indicates an automated action, performing the automated action, wherein the automated action at least includes a software update for the one or more computing systems associated with the tenant.

19. A computer program product for automated process performance determination, the computer program product being embodied in a non-transitory computer readable storage medium and comprising computer instructions for:
   receiving, from a plurality of tenant database systems, log data associated with a plurality of tenants, wherein the log data comprises one or more log data types;
   aggregating the log data into an aggregated set of log data;
   determining, using a processor, a set of metrics based at least in part on the aggregated set of log data, wherein a metric of the set of metrics is associated with a tenant of the plurality of tenants and one of the one or more log data types, wherein the set of metrics for a tenant are based on an amount of time needed by one or more computing systems associated with the tenant to perform one or more tasks;
   determining a composite metric for the tenant by combining metrics of the set of metrics associated with the tenant;
   determining a response based at least in part on the composite metric; and
   in the event the response indicates an automated action, performing the automated action, wherein the automated action at least includes a software update for the one or more computing systems associated with the tenant.

* * * * *